United States Patent
Chambers et al.

(10) Patent No.: US 8,532,269 B2
(45) Date of Patent: Sep. 10, 2013

(54) IN-BAND SIGNALING IN INTERACTIVE COMMUNICATIONS

(75) Inventors: Robert L. Chambers, Sammamish, WA (US); Larry Coryell, Sunnyvale, CA (US); Karen J. Kaushansky, San Francisco, CA (US); Julian James Odell, Kirkland, WA (US); Jim C. Chou, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 12/354,799

(22) Filed: Jan. 16, 2009

(65) Prior Publication Data

US 2010/0183126 A1 Jul. 22, 2010

(51) Int. Cl.
*H04M 1/64* (2006.01)
*G10L 11/00* (2006.01)

(52) U.S. Cl.
USPC .................................. 379/88.04; 704/270

(58) Field of Classification Search
USPC ............................ 379/88.01–88.22
See application file for complete search history.

(56) References Cited

U.S. PATENT DOCUMENTS

| | | | |
|---|---|---|---|
| 5,267,305 A | 11/1993 | Prohs et al. | |
| 5,572,587 A | 11/1996 | Gaglani | |
| 6,591,234 B1 | 7/2003 | Chandran et al. | |
| 7,356,471 B2 * | 4/2008 | Ito et al. | 704/270.1 |
| 7,362,811 B2 | 4/2008 | Dunne et al. | |
| 2006/0126803 A1* | 6/2006 | Patel et al. | 379/88.01 |
| 2006/0229093 A1 | 10/2006 | Bhutiani et al. | |
| 2007/0141993 A1 | 6/2007 | Franz et al. | |
| 2007/0290883 A1* | 12/2007 | Kuboyama | 340/825.72 |
| 2008/0152094 A1* | 6/2008 | Perlmutter | 379/88.01 |
| 2009/0204409 A1* | 8/2009 | Mozer et al. | 704/275 |
| 2009/0228126 A1* | 9/2009 | Spielberg et al. | 700/94 |

OTHER PUBLICATIONS

"VoiceGuide Online Help", retrieved at <<http://www.voiceguide.com/vghelp/source/html/inbandsignaling.htm>>, Nov. 4, 2008.
"SkypeIn DTMF Recognition", retrieved at <<http://forum.skype.com/lofiversion/index.php/t86283.html>>, Nov. 4, 2008.
"Voice over IP Technology", retrieved at <<http://www.ietf.org/mail-archive/web/sigtran/current/pdfT202wouqeK.pdf>>, 2004.
"Overview", retrieved at <<http://sohonet.net/s90eng/market.html>>, Nov. 4, 2008.
"Product Review: Net.Com's SIP VoIP Gateway", retrieved at <<http://www.callcentermagazine.com/showArticle.jhtml?articleId=18300120>>, Nov. 4, 2008.

\* cited by examiner

*Primary Examiner* — Simon Sing
*Assistant Examiner* — Solomon Bezuayehu
(74) *Attorney, Agent, or Firm* — Hope Baldauff, LLC

(57) ABSTRACT

Architecture that employs a combination of in-band signaling (e.g., DTMF) with speech recognition to deliver usability improvements. The in-band signaling allows the user to indicate to the system when a barge-in operation is occurring and/or when to start listening to subsequent speech input and optionally, when to stop listening for further speech input. The in-band signaling can be utilized during a telephone call and using wireline and wireless telephones. Moreover, the architecture can be incorporated at the platform level requiring little, if any, application changes to support the new mode of operation.

19 Claims, 13 Drawing Sheets

IN-BAND SIGNALING IN INTERACTIVE COMMUNICATIONS

BACKGROUND

In noisy environments speech recognition systems can be susceptible to errors due to the pickup of extraneous noise. A particular problem in speech recognition systems is the false detection of background noise as speech that introduces errors and interrupts the flow of the dialog by introducing "dead air" where the system and the user are both waiting for the other to speak. Such a problem significantly inhibits the usability and user experience.

Interactive voice response (IVR) systems, for example, adopt a different style where the system and user take turns interacting based on system prompts and user responses. However problems can occur in noisy environments for this type of system, as well. Since the only channel for the system to communicate to the user is via audio, it is possible that the system reacts ("hears") to a noise interruption and stops playing a prompt that instructs the user what to do next. When the user has not actually spoken and the IVR prompt was interrupted by the extraneous noise, the resulting "dead air" silence of the IVR system is confusing. One limited solution to this problem offered by IVR systems is the use of DTMF (dual-tone multi-frequency) data entry. This can be more robust than speech recognition based systems; however, these systems typically suffer from poor user interfaces because of the limited number of choices possible for each answer.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs a combination of in-band signaling with speech recognition to deliver usability improvements. The in-band signaling allows the user to indicate via a marker signal to a system such as an interactive voice response system, when to interrupt an automated prompt being played and/or to start listening to subsequent input. For example, while the user is listening to a prompt message, the user can input the marker signal, the result of which is the system stops play of the prompt message, and enters a listening mode to receive user speech input. The marker signal can also be employed to indicate to the system that user speech input will directly follow. Still further, the marker signal can indicate to the system when to stop listening (end-pointing) for further speech input. It can be the case where the marker signal used to "barge-in" over the prompt message also functions as the starting point of the speech input, or two separate inputs of the marker signal are utilized to barge-in, and then to indicate the starting point of speech input.

The marker signal can be a DTMF (dual-tone multi-frequency) signal, for example, that is interpreted by the system to indicate the associated functionality (e.g., barge-in, starting point, end-point, etc.). Utilization of the in-band signaling is particularly useful where background noise can impact the successful processing of speech input, such as in vehicles, meetings, warehouses, and so on.

The in-band signaling can be utilized during a regular telephone call and with wireline and wireless telephones. Moreover, the architecture can be incorporated at the platform level requiring little, if any, application changes to support new mode(s) of operation.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
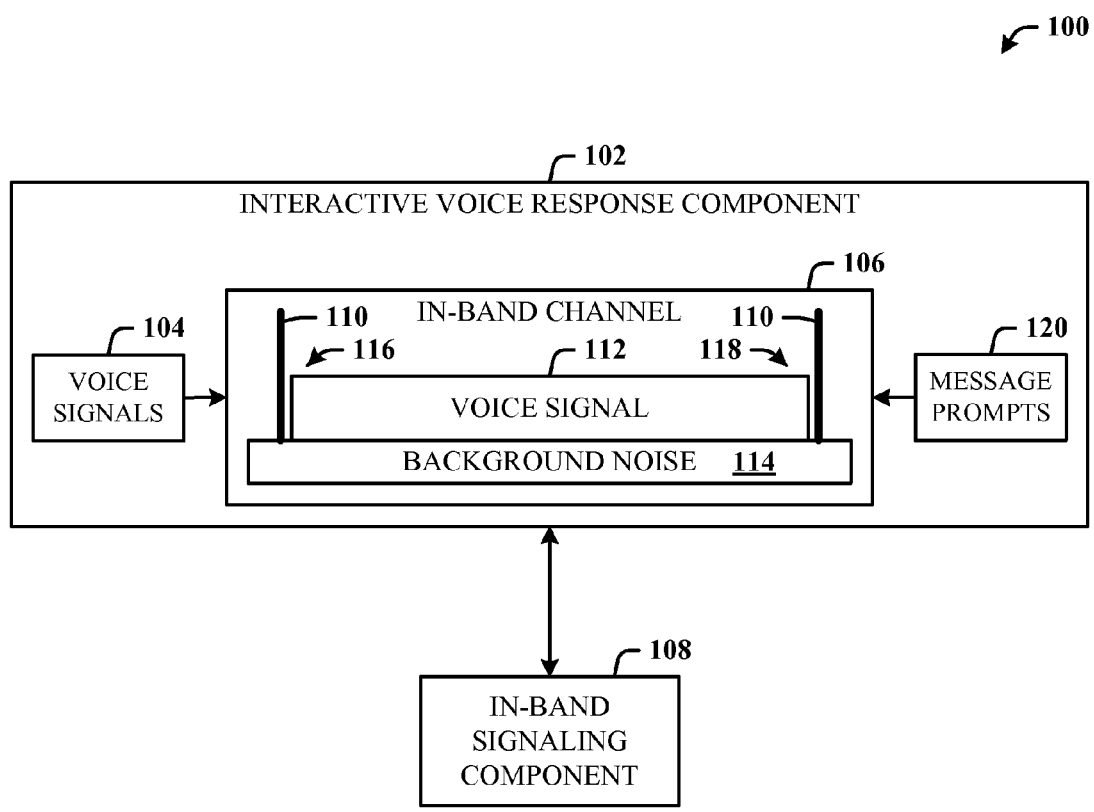
FIG. 1 illustrates a voice response communications system in accordance with the disclosed architecture.

The disclosed architecture adds a multimodal extension to interactive voice response (IVR) systems. One or more in-band signals can be input to interrupt ("barge-in") automated responses (or message prompts) to stop the prompts from being played further. The user can then input speech or execute other functionality, if desired. The barge-in signal can be a speech input (e.g., word, phrase, etc.) that when processed by a speech recognition engine terminates play of the prompt. In-band signal(s) can also be utilized indicate to the system the start of user speech input and/or the end of the user speech input.

Robust, but simple DTMF (dual-tone multi-frequency) signals (tones) can be employed as the marker signal for barge-in of the prompt message and/or speech input delineation (e.g., starting point, ending point) to control the turn taking between the IVR system and the source of the voice signals. For example, the user presses a key of a communications device keypad before speaking, and optionally, the associated key signal indicates the end of the user response. This mechanism can be seamlessly integrated into existing applications with the IVR system either automatically falling back to this mechanism (a marker mode) or the user requesting the marker mode. When the system automatically determines that it is appropriate to use this mechanism (either from detecting high levels of background noise or determining that the system has erroneously barged-in, the system will play an instruction to the user instructing the user to press a key (e.g., asterisk "*") relative to the user voice signals.

The use of in-band signaling can be employed in a wireless/wireline telephone call and with a wireless/wireline telephone. Marking the ending point based on DTMF signals provides improved robustness in voice recognition processing and the user experience with the IVR system overall. The DTMF signal can be one or more of any valid DTMF tones as specified by a platform (IVR system) creator or application developer, for example. Moreover, a platform feature is that there is no need for application updates.

The disclosed architecture finds application as well, in environments that include noisy backgrounds, such as in vehicles, business spaces, etc. The input of a DTMF signal as a marker reduces false triggers and facilitates unambiguous turn-taking between the user and the IVR system. For example, if the voice-response system learns the user voice input, it can be prone to erroneously thinking that background noise or words not directed at the system is an instruction meant for the system. Additionally, by disambiguating turn taking between the user and the IVR system, the user can control the pace of the conversation and pay attention to the road (in a vehicle embodiment) when necessary.

The use of in-band barge-in of a message prompt and, start-pointing and/or end-pointing of voice signals can be managed by manually or automatically by enabling these features at the IVR location or made configurable by the application developer. For example, management can be by requiring the use of the marker signal(s), requiring the marker signal(s) under specified detectable circumstances, and/or never requiring the use of the marker signal(s). The use of one or more of such features can be made optional or a subscription to the user. For example, when automatically enabled, in-band messaging can present to the user an option for disabling some or all of the features, or subscribing to some or all of the features.

The utilization of the marker signal(s) (for barge-in signaling, start-pointing, end-pointing) can also be "parameterized" such as in accordance with a detectable reduction speech recognition accuracy, suspected reduced speech recognition accuracy (e.g., based on noise levels, noise types, or other detectable data and information), or based on phone type, phone carrier, caller ID, phone number called, and so on.

The use of the in-band marker signal(s) can also be employed to cancel speech recognition processing of voice signals being input and/or to cancel a current turn. For example, if the message prompt plays and the user performs a barge-in, this can be configured as an indication to skip the subsequent user turn for input of the voice signals, and move to a next message prompt, returns to a previous mode, or returns to a previous message prompt. A series of two marker signals can indicate to move back two message prompts, for example. Still further, the use of in-band signaling (e.g., by DTMF) can be employed to configure the voice applications as to what tones (key) to recognize for specific actions (e.g., barge-in, start pointing, end-pointing). In yet another example, if during a listen state, a DTMF "*" is input by the user and detected, this can be configured to automatically initiate a re-prompt of the current prompt (a replay operation).

A marker signal can also be input during a message prompt to pause the prompt, and then resume the prompt after a predetermined time (e.g., 2 seconds). Alternatively, or in combination therewith, a marker signal during prompt play can interrupt play and cause rewind of the prompt backward a few seconds, for example, for replay from that point forward.

It can also be the case where specific marker signal(s) can initiate calibration (or tuning) of the speech recognition for a given environment (e.g., meeting room, vehicle, etc.). In other words, while the user vehicle is idling in a stationary position or the vehicle is moving, input of a specific marker signal or combination of marker signals, automatically enters a calibration mode that receives the background noise for processing, with or without user voice input. Once calibrated to the environment, improved recognition accuracy can be obtained.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a voice response communications system 100 in accordance with the disclosed architecture. The system 100 includes an interactive voice response component 102 for sending message prompts 120 and receiving voice signals 104 via an in-band channel 106, and an in-band signaling component 108 for inputting a marker signal 110 (a voice marker signal) relative to a voice signal 112 to delineate the voice signal 112 in the presence of background noise 114 also received into the in-band channel 106. The voice signals 104 are typically provided in response to message prompts 120 provided by an automated prompting system of the interactive voice response component 102.

The interactive voice response component 102 automatically enables processing of the marker signal 110 via the in-band channel 106 in response to an amount of the background noise 114 that impacts speech recognition accuracy. The marker signal 110 can be input prior to initiating the voice signal 112 to designate a starting point 116 of the voice signal 112. Alternatively, the marker signal can be input after termination of the voice signal 112 to designate an ending point 118 of the voice signal 112. Still alternatively, interactive voice response component 102 enables and processes the marker signal 110 as input prior to initiating the voice signal 112 to designate the starting point 116 of the voice signal 112, and after termination of the voice signal 112 to designate an ending point 118 of the voice signal 112.

The marker signal 110 can be input using a DTMF signal, which many different DTMF signals are commonly designed into keypads of phones (e.g., wireline, wireless), for example. Moreover, different DTMF signals can be instructed for input to mark the starting point 116 and ending point 118. The interactive voice response component 102 can be configured to automatically send an instruction for how to input the marker signal. Additionally, the interactive voice response component 102 can be configured to automatically send the instruction(s) in response to reduced accuracy of an associated speech recognition engine due to the background noise. For example, IVR systems typically have associated speech recognition engines for processing user speech input (voice signals). The interactive voice response component 102 can automatically return to a normal mode (operating without the input of marker signal(s)) from a marker mode (operating with the input of the marker signal(s)) in response to improved accuracy of an associated speech recognition engine relative to the background noise.

Figure 2:
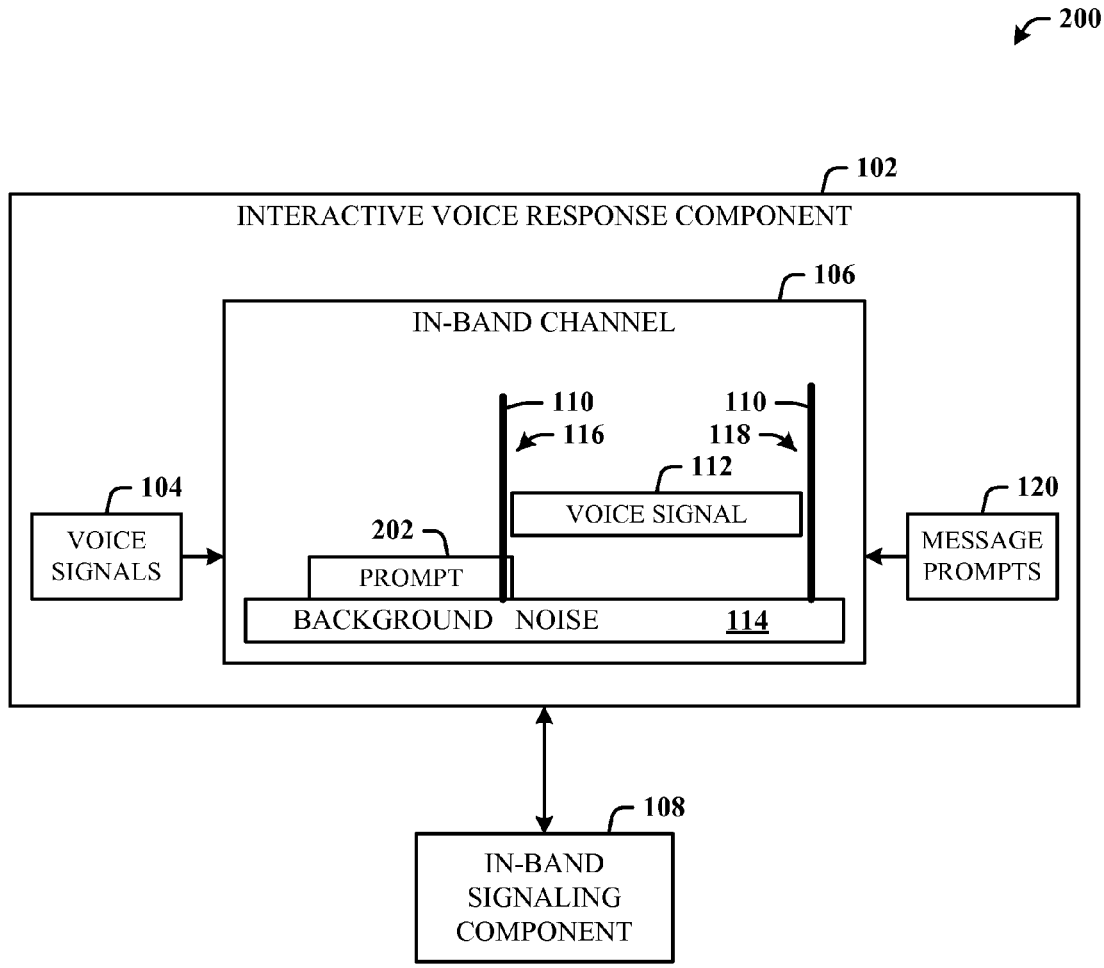
FIG. 2 illustrates a barge-in system for interrupting and terminating play of automated message prompts.

FIG. 2 illustrates a barge-in system 200 for interrupting and terminating play of automated message prompts. The barge-in system 200 can include the same entities illustrated in system 100 of FIG. 1; however, the marker signal 110 also facilitates the barge-in signal functionality. Here, the marker signal 110 is input while a message prompt 202 is playing to the user. Note that it is not a requirement that barge-in operation be in the presence of background noise 114, since barge-in can be employed in any environment. Here, the marker signal 110 not only terminates the message prompt 202, but also indicates the starting point 116 of the voice signal 112 input by the user to the voice response component 102, and the ending point 118 of the user voice signal input.

It can be the case that one input of the marker signal 110 (a prompt marker signal) performs barge-in, and a second input of the marker signal 110 is interpreted as the starting point 116 for the voice signal 112. It can also be the case that a marker signal for the barge-in function is different than the marker signal 110 for the starting point 116 and the ending point 118. As previously indicated, the marker signal 110 can be voice input in the form of a combination of words that when processed by the voice response component 102 stop play of the message prompt 202. This provides for hands-free operation in environments such as operating a vehicle, for example.

In another application, the marker signal 110 can be generated from a single tap of a button. In other words, a user can use a single touch to interrupt and begin to interact with a voice application. The single touch can be a button on a steering wheel, key on a phone, movement (e.g., tilt) of a mobile device (e.g., cell phone), or other external device that is connected to a voice application locally or in the cloud (e.g., the Internet). The interrupt is a notification to the voice response component 102 (either directly or indirectly) that the user is ready to speak and/or wants to stop the current audio prompt. The button or key can be "tapped" and not held, and the voice application responds accordingly. This approach allows for a more convenient and natural interaction model with the voice application while the caller is in a noisy and/or hands free environment.

Alternatively, one or more DTMF signals can be generated that serve as the interrupt mechanism to be interpreted by the voice application as a barge-in and for caller input. A specific DTMF signal can be recognized as an indication the user is ready to speak, thus, when the DTMF tone is received, the voice application enters a listen state with the appropriate grammars loaded. The DTMF signal(s) can be generated in many ways including by not limited to, a button or key push, phone motion, voice activation, or other mechanisms.

As previously described, the interrupt mechanism can be used to indicate to a voice application the caller is ready to speak, allowing the caller to say something as input, and then end-pointing the audio automatically in the cloud. In other words, when the caller initiates barge-in (e.g., via a button or key), the voice application is interrupted and enters a listen state to begin capturing the caller speech. It can also be the case where barge-in can also trigger replay of the prompt, jump to a new prompt for play, jump back to IVR menu, and so on. End-pointing can be performed locally using the interrupt (barge-in marker signal) or by the platform in the cloud.

As previously described, the marker signal 110 can be input for starting, ending, delineating multiple inputs, and/or cancelling a current turn. For example, if during a listen state, a DTMF "*" is input by the user and detected, this can be configured to automatically initiate a re-prompting of the current prompt (a replay operation). This means that the marker signal 110 for the end point 118 of the voice signal 112 can initiate the same operation as the marker signal 110 at the starting point 116.

Figure 3:
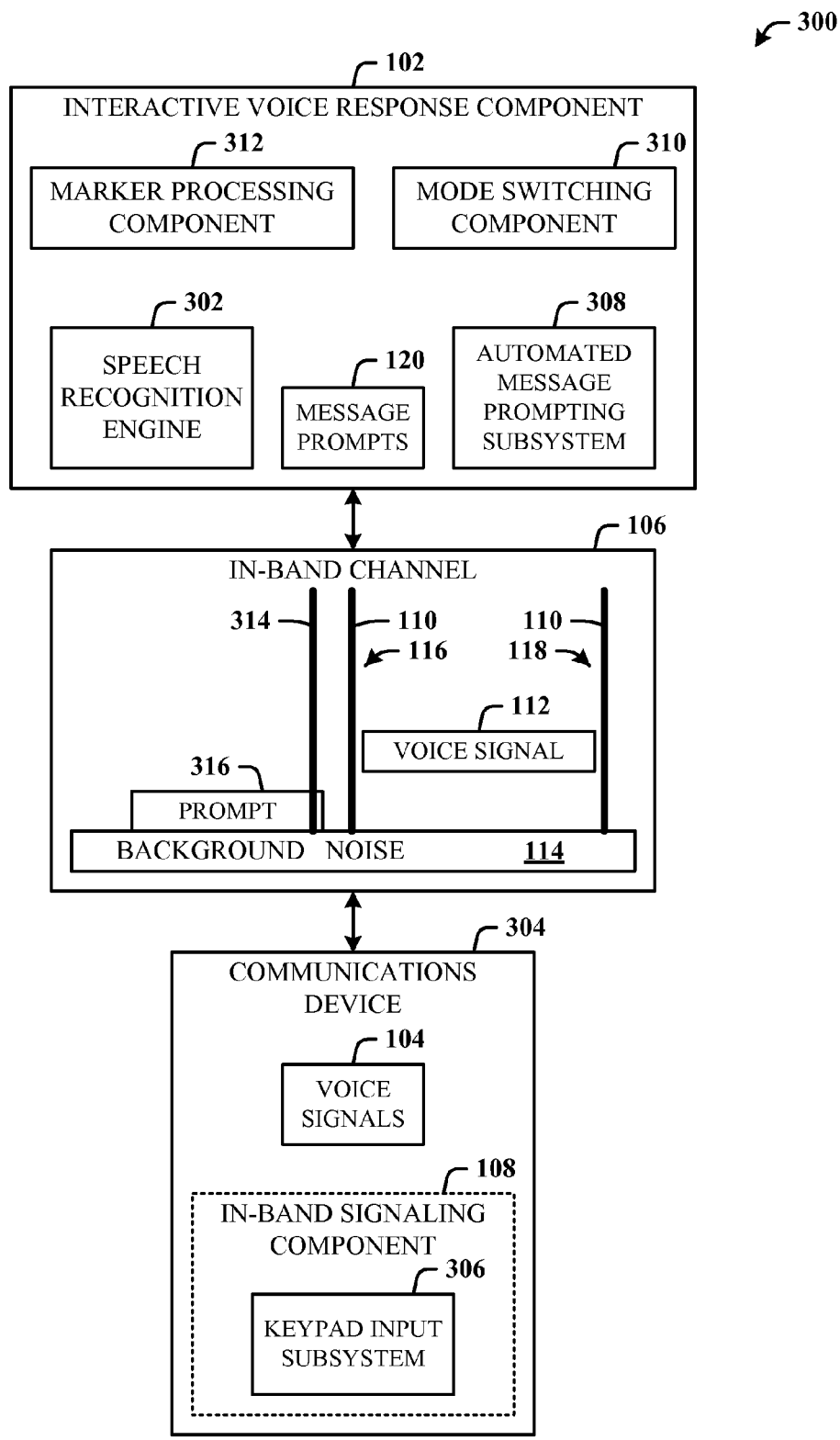
FIG. 3 illustrates a more detailed implementation of an interactive voice response communications system for barge-in and voice input.

FIG. 3 illustrates a more detailed implementation of an interactive voice response communications system 300 for barge-in and voice input. The system 300 depicts that the interactive voice response component 102 can include a speech recognition engine 302 for processing the voice signals 104 from a user who interacts with the voice response component 102 via a communications device 304 (e.g., a telephone, vehicle-based voice interactive system). The in-band signaling component 108 of the device 304 includes a keypad input subsystem 306 where a user can press a key (or a system can select activate) that is associated with a DTMF tone or other signal from which a marker signal can be obtained. Different tones can be associated with the different keys of the keypad subsystem 306.

The interactive voice response component 102 can include an automated message prompting subsystem 308 that includes the multiple message prompts 120 for transmission to the device 304 via the in-band channel 106 and play (presentation) via a device audio system. The voice signals 104 issued from the device 304 over the in-band channel 106 can be considered a voice stream that includes one or more of the voice signals 104. In other words, rather than input the marker signal 110 for each separate user voice response to a single message prompt from the response component 102, which can be done, the user can input the single marker signal 110 for multiple voice signal responses by the user to the multiple prompts 120 presented by the response component 102. Thus, the marker signal 110 can be input to signal the starting point of the voice stream.

The interactive voice response component 102 can operate in at least two modes using a mode switching component 310: normal mode and marker mode. Normal mode is the standard IVR-type interaction without the marker signal input. Marker mode is entered when the response component 102 receives information from the speech recognition engine 302 indicating that the accuracy of the speech recognition process is reduced below an accuracy threshold due to impact of the background noise 114 portion of the in-band channel 106. Normal mode can be re-entered from the marker mode when the response component 102 receives information from the speech recognition engine 302 indicating that the accuracy of the speech recognition process is improved above the accuracy threshold due to a reduced presence of the background noise 114 portion in the in-band channel 106.

The interactive voice response component 102 can issue instructions in the form of in-band prompts to the user to inform the user to begin using the marker signal for more effective communications processing by the recognition engine 302 and the user experience overall. In other words, the response component 102 initiates the marker mode.

Alternatively, the user can initiate marker mode. Rather than wait for the response component 102 to assess the recognition accuracy and instruct the user to use marker mode, if the user is familiar with this architecture and knows the background noise may be problematic, the user can initiate the marker signal 110 (e.g., by voice input or tap), after which the response component 102 automatically interprets this marker signal 110 to enter marker mode. All subsequent communications can then remain in marker mode. However, in order to provide a more contrasting signal exchange with respect to voice signals and speech recognition (and speech learning that may be employed), it can be more effective in some instances to input marker signals throughout the interactive exchange.

The response component 102 can also include a marker processing component 312 for detecting the marker signal 110 relative to the in-band voice stream. This can include routing the voice signals to the recognition engine 302, and recognizing the voice signals; however, discarding the voice signals before the marker signal. This can also include retaining recognition data of the voice signals processed before the starting point marker signal, but assigning a lower priority to such recognition data than the recognition data of the voice signals processed after the starting point marker signal.

Voice signal recognition processing can also be based on timestamp data associated with the input of the marker signal. The timestamp data is then transmitted data can then be processed by the marker processing component 312 for use by the engine 302 to weight recognition data after the starting point marker signal than data obtained before the marker signal. A similar process can be applied to an ending point marker signal by either ignoring voice signal recognition data entirely after an ending point marker signal or applying a lower weighting parameters to such recognition data indicating that the voice signals after the marker signal is not as reliable. Other commonly-known techniques for prioritizing input and output data to recognition processing can be applied as well.

In an alternative embodiment, based on the location of the marker signal, the voice signals can be ignored entirely as input to the recognition engine 302 to avoid burdening the recognition engine 302 with processing that may not be needed.

Put another way, the voice response communications system 300 can include the interactive voice response component 102 (as part of an IVR system) for receiving the voice signals 104 via the in-band channel 106 in presence of the background noise 114. The voice signals 104 are processed by the speech recognition engine 302, in the presence of the background noise 114. The system 300 can also include the in-band signaling component 108 for inputting the marker signal 110 in the form of the DTMF signal into the in-band channel 106 to delineate at least one of the starting point 116 of a voice signal or the ending point 118 of a voice signal. As depicted, the marker signal 110 can be employed with multiple voice signals defined as the voice stream.

The interactive voice response component 102 can automatically enable processing of the marker signal 110 via the in-band channel 106 in response to the background noise 114 impacting the speech recognition accuracy. The interactive voice response component 102 can automatically switch between a normal mode and a marker mode in response to changes in the accuracy of the speech recognition engine 302 in processing the voice signals 104 relative to the background noise 114. The interactive voice response component 102 can automatically send an instruction (or multiple instructions) for how to input the marker signal 110. For example, an instruction set can be to "Press 8, to indicate the start of your voice input"; "Press 8 again, to indicate the end of your voice input". Another instruction can be to "Press 8, to indicate the start of your voice input and Press 9, to indicate the end of your voice input". The interactive voice response component 102 can automatically send the instruction in response to reduced accuracy of the associated speech recognition engine 302 due to the background noise 114.

Here, a different marker signal 314 is generated for barge-in of a message prompt 316. The user can then input the marker signal 110 for the starting point 116 and ending point 118 of the voice signal 112. The different marker signal 314 can be generated from voice input (e.g., recognized locally or by the voice response component 102), button tap, or other mechanisms.

In other words, the computer-implemented voice response communications system 300 comprises the interactive voice response component 102 for sending message prompts and receiving voice signals via an in-band channel, and the in-band signaling component 108 for inputting an in-band prompt marker signal during a message prompt to interrupt play of the message prompt, and inputting one or more voice marker signals for delineating a voice signal as part of speech recognition processing. The prompt marker signal can be generated via a vehicle and communicated to the voice response component by way of a mobile device associated with the vehicle, and the prompt marker signal terminates play of the message prompt and marks start of the voice signal. The voice response component 102 sends instructions for further use of available in-band features related to interrupt of message prompts and delineation of voice signals, manually and/or automatically.

Figure 4:
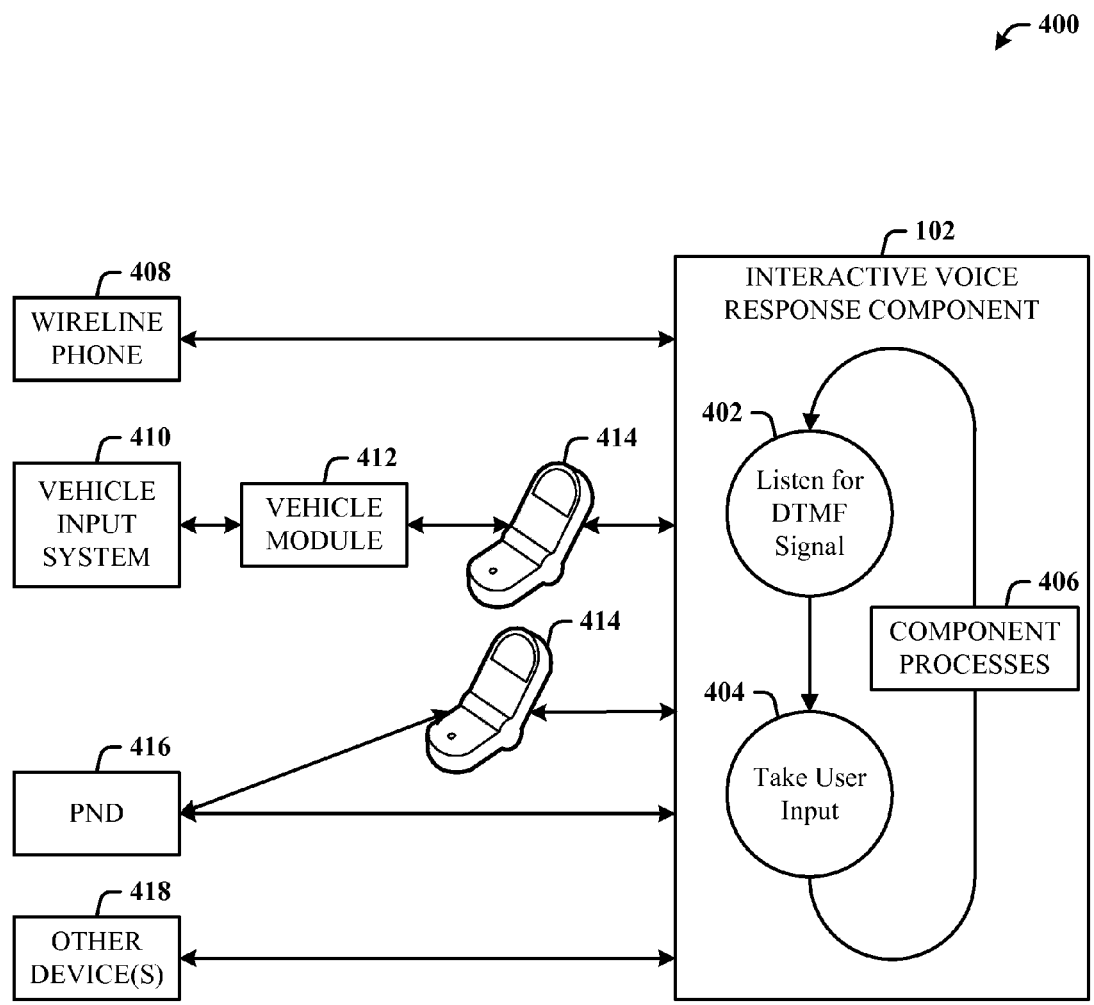
FIG. 4 illustrates an alternative system for voice/response processing.

FIG. 4 illustrates an alternative system 400 for voice/response processing. The voice response component 102 is represented as including a listen method 402 that listens for DTMF signal input and a speech method 404 that receives user voice signals. The voice response component 102 also includes component processes 406 for other functions such as obtaining and loading grammars, and performing end-pointing in the cloud, if desired. The component processes 406 can also include receiving voice input in the form of a limited hot-word barge-in (e.g., set only to accept DTMF input).

User interaction (e.g., voice, DTMF, etc.) with the response component 102 can be via a wireline phone 408, using DTMF and/or voice commands. In a vehicle environment, a vehicle input system 410 can receive a tap, key press, and/or voice input. For example, the tap mechanism can be conveniently mounted on the steering wheel or nearby (e.g., center console, dash, etc.). The tap input can be passed to a vehicle module 412 that communicates the tap signal wirelessly (e.g., Bluetooth or other short range wireless technology) to a user cell phone 414 in the vehicle for in-band transmission to the voice response component 102. The tap signal can be the marker signal for barge-in of a message prompt, start-pointing, and/or end-pointing of voice signals.

The system 400 can also include a personal navigation device (PND) 416 that can communicate information via the cell phone 414 to the voice response component 102 or directly to the voice response component 102. Other device(s) 418 can be employed as well.

The vehicle module 412 includes module code to generate the appropriate DTMF signal (e.g., an asterisk "*" signal) when the tap button (e.g., on the steering wheel) is pushed while the caller is actively connected to the voice response component 102. The DTMF signal tone is then sent through the caller cell phone 414 which can be paired with the vehicle module 412 via Bluetooth. The signal tone is received and processed by the voice response component 102.

On the response component side properties within a single form can be employed to handle the transition from the non-listening mode to listen mode. In one no-input event implementation, the system begins in a non-listening state and only transitions to the listening state after the prompt has finished playing or the user taps the interrupt button. The interrupt button signal is handled by enabling barge-in with a limited hot word. This forces the component 102 to match exactly any audio with the loaded grammar which only has the specific DTMF tone. Thus, other audio-like background noise, etc., does not generate a no-match event.

Once the component 102 has started to respond to the user, the component 102 returns to a non-listening state so that the user cannot interrupt any of the presented audio (message prompt), except through the interrupt button or key. The audio input is initiated by the DTMF signal being received by the component 102 (e.g., and also the endpoint of the audio as determined by the component 102 or in the cloud).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
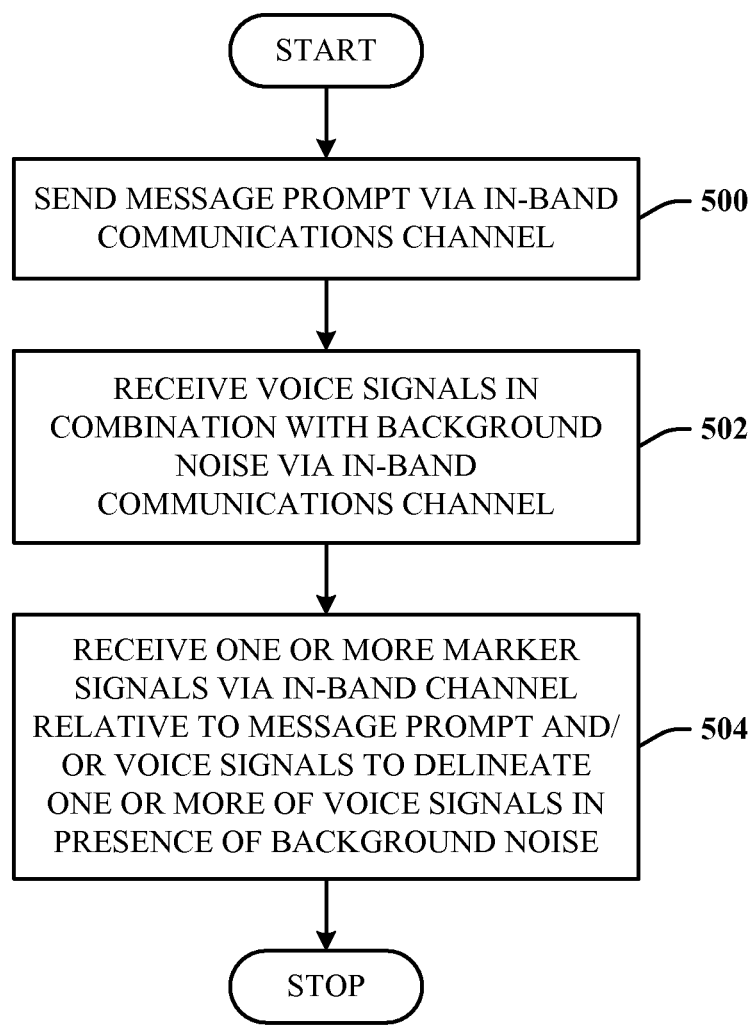
FIG. 5 illustrates a method of voice response communications.

FIG. 5 illustrates a method of voice response communications. At 500, a message prompt is sent via an in-band communications channel. At 502, voice signals are received in combination with background noise via the in-band communications channel. At 504, one or more marker signals are received via the in-band channel relative to at least one of the message prompt or the voice signals, the one or more marker signals are relative to the voice signals to delineate one or more of the voice signals in the presence of the background noise.

The method can further comprise entering a marker mode based on receipt of a marker signal and processing voice signals received after the marker signal, and automatically entering a marker mode and sending an instruction to a source of the voice signals to input a marker signal for further communications.

The method can further comprise inputting a marker signal to designate at least one of a starting point of the voice signals or an ending point of the voice signals. The method can further comprise activating a DTMF signal in response to sending a marker signal.

The method can further comprise switching between a marker mode and a normal mode based on recognition accuracy of the voice signals relative to the background noise, and interrupting play of the message prompt when receiving a marker signal during play of the message prompt. The method can further comprise receiving a marker signal generated via a vehicle by way of a mobile device associated with the vehicle.

Figure 6:
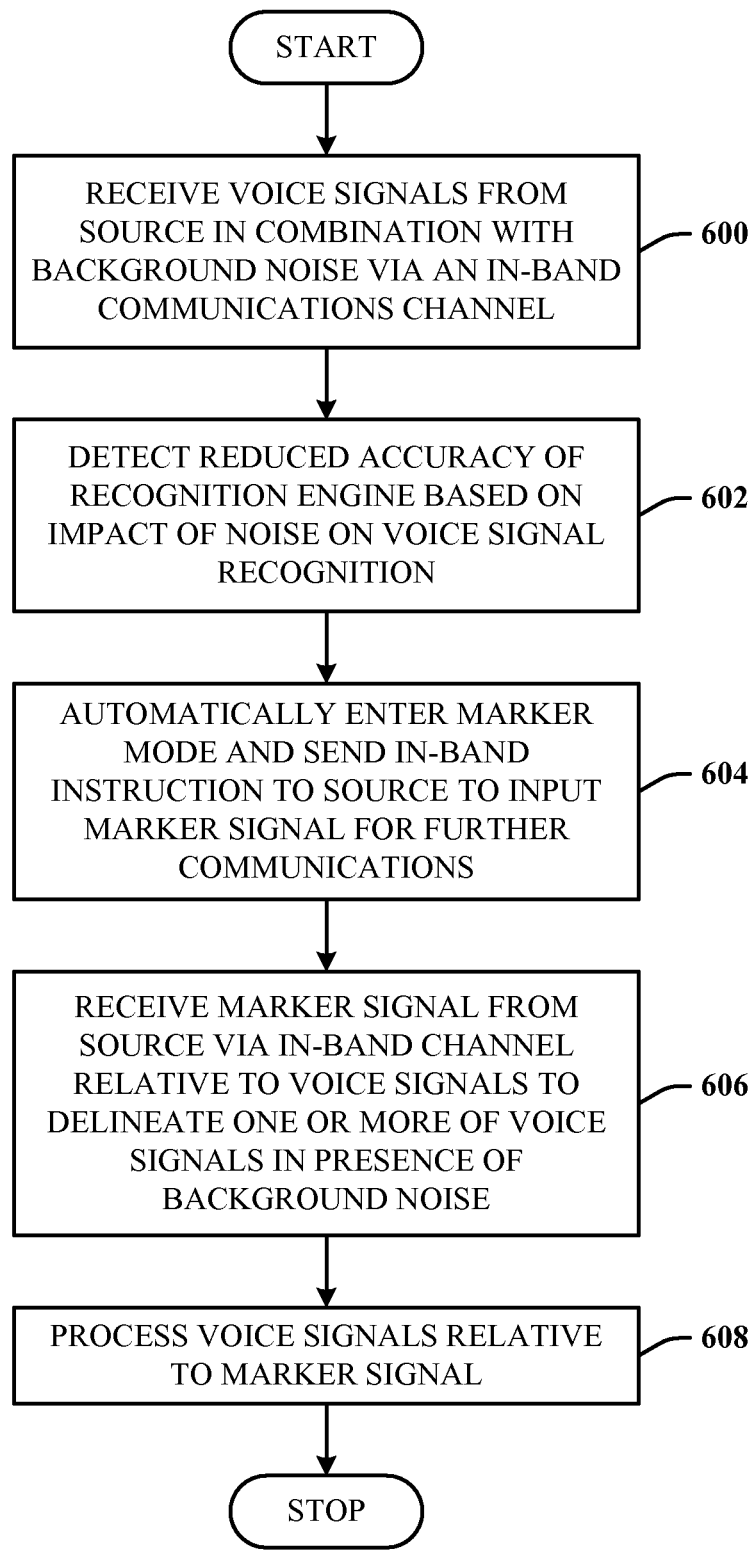
FIG. 6 illustrates a method of enabling marker signal input based on recognition accuracy.

FIG. 6 illustrates a method of enabling marker signal input based on recognition accuracy. At 600, voice signals are received in combination with background noise via an in-band communications channel. At 602, reduced output accuracy in the recognition engine is detected based on the impact of the background noise on recognition processing. At 604, marker mode is automatically entered and an in-band instruction is sent to the source to input a marker signal for further communications. At 606, the marker signal is received from the source via the in-band channel relative to the voice signals to delineate one or more voice signals in the presence of the background noise. At 608, the voice signals are processed relative to the marker signal.

Figure 7:
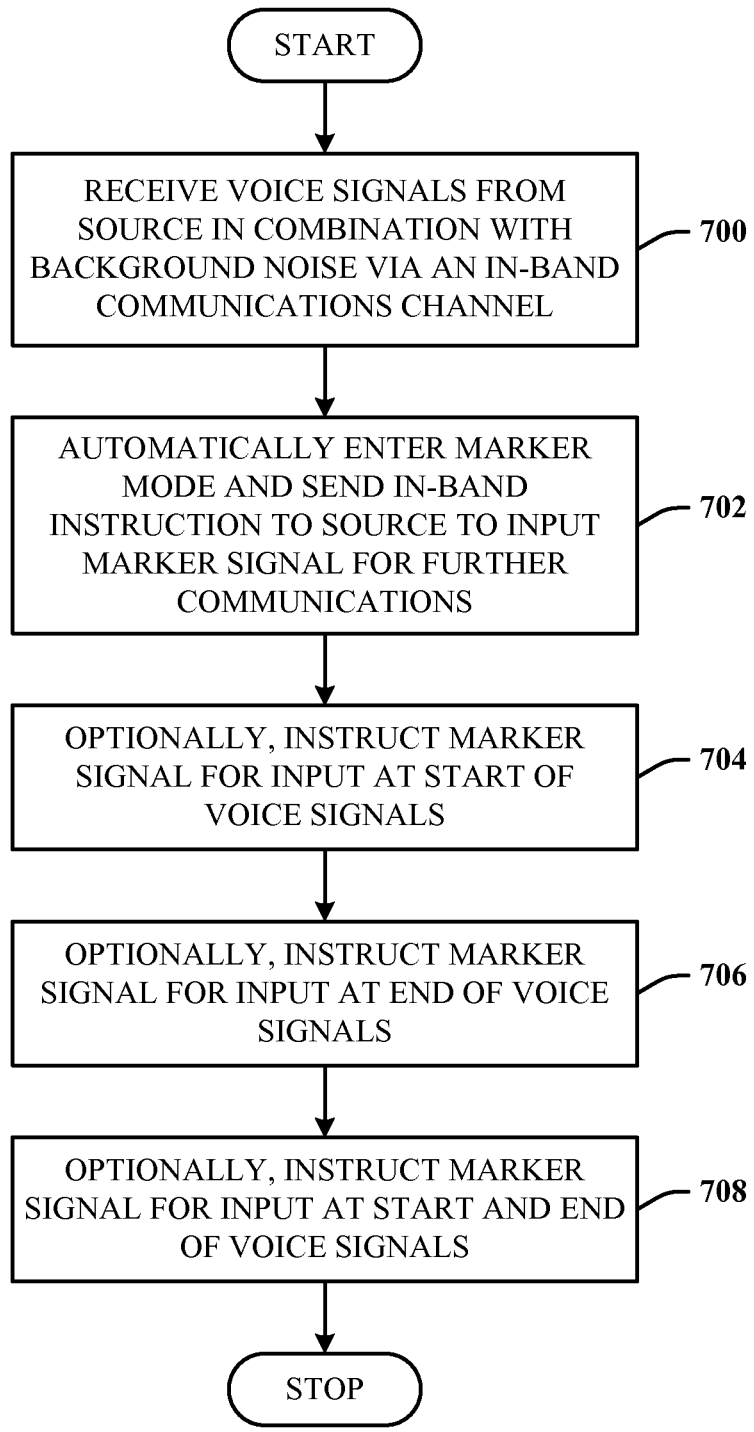
FIG. 7 illustrates a method of providing in-band signaling based on one or more marker signals.

FIG. 7 illustrates a method of providing in-band signaling based on one or more marker signals. At 700, voice signals are received in combination with background noise via an in-band communications channel. At 702, marker mode is automatically entered and an in-band instruction is sent to the source to input a marker signal for further communications. At 704, optionally, the instruction instructs for the marker signal to be the starting point of the voice signals. At 706, optionally, the instruction instructs for the marker signal to be the ending point of the voice signals. At 708, optionally, the instruction instructs for marker signals to be input at the starting point and the ending point of the voice signals.

Figure 8:
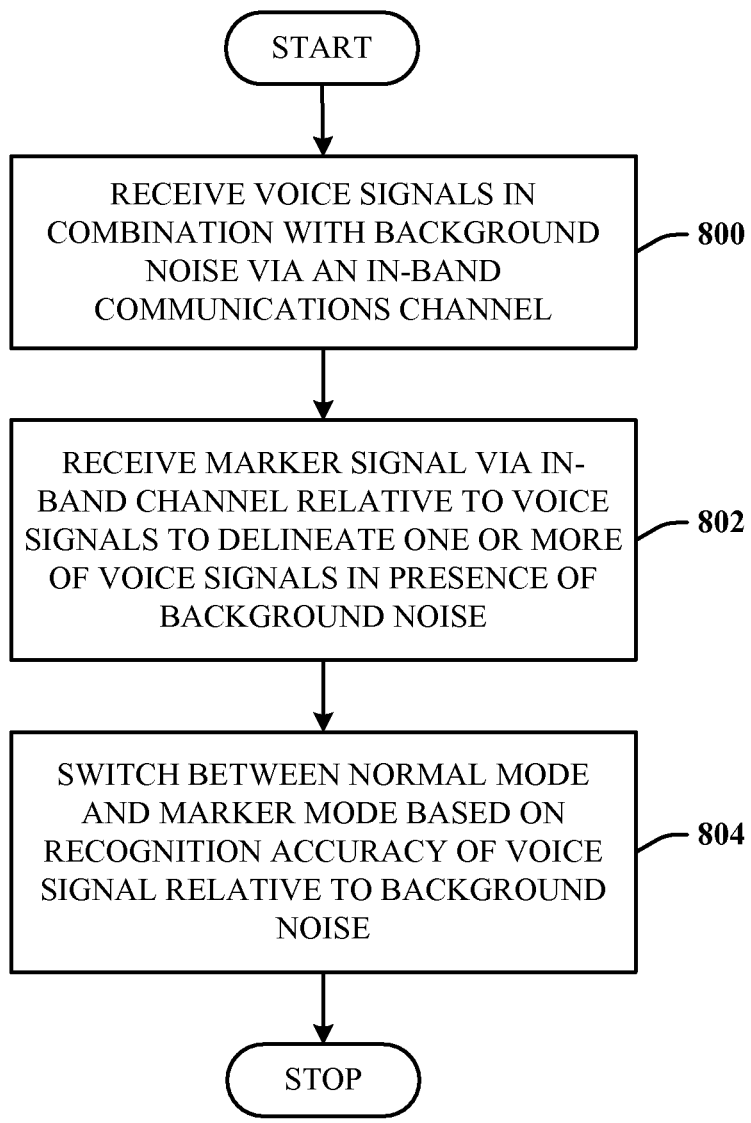
FIG. 8 illustrates a method of switching between operational modes based on recognition accuracy.

FIG. 8 illustrates a method of switching between operational modes based on recognition accuracy. At 800, voice signals are received in combination with background noise via an in-band communications channel. At 802, a marker signal is received via the in-band channel relative to the voice signals to delineate one or more of the voice signals in the presence of the background noise. At 804, switching occurs automatically between normal mode and marker mode based on recognition accuracy of voice signals relative or the background noise.

Figure 9:
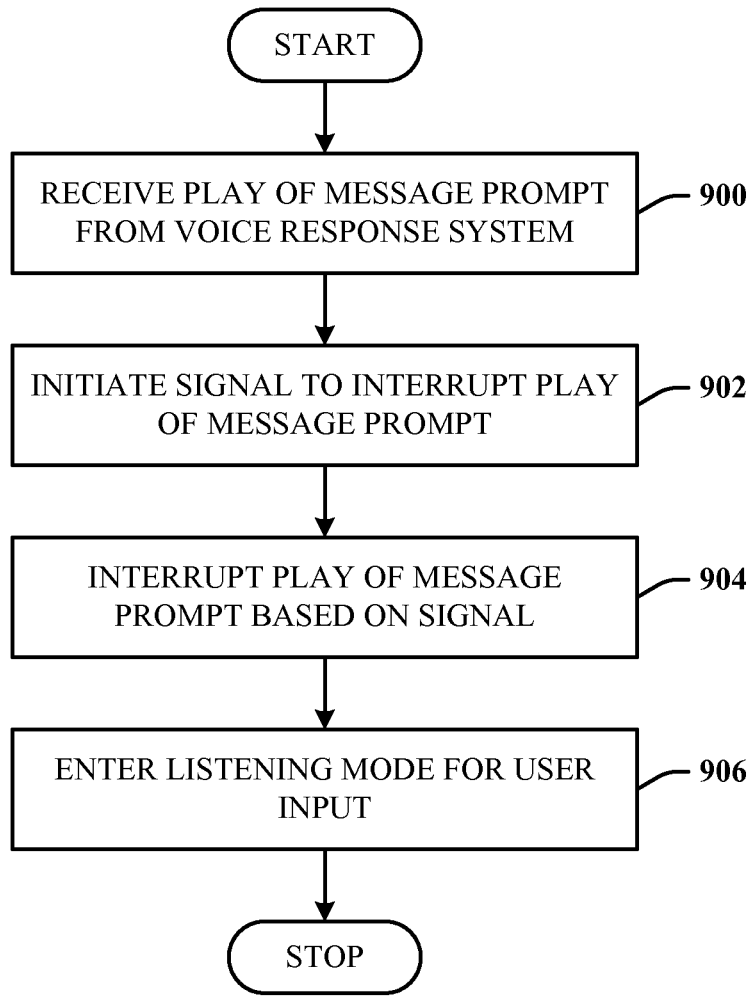
FIG. 9 illustrates a method of providing barge-in of a prompt.

FIG. 9 illustrates a method of providing barge-in of a prompt. At 900, play of a message prompt from a voice response system is received. At 902, a signal (e.g., DTMF) is initiated to interrupt the play of the message prompt. At 904, play of the prompt message is interrupted based on the signal. At 906, a listening mode is entered for user input.

Figure 10:
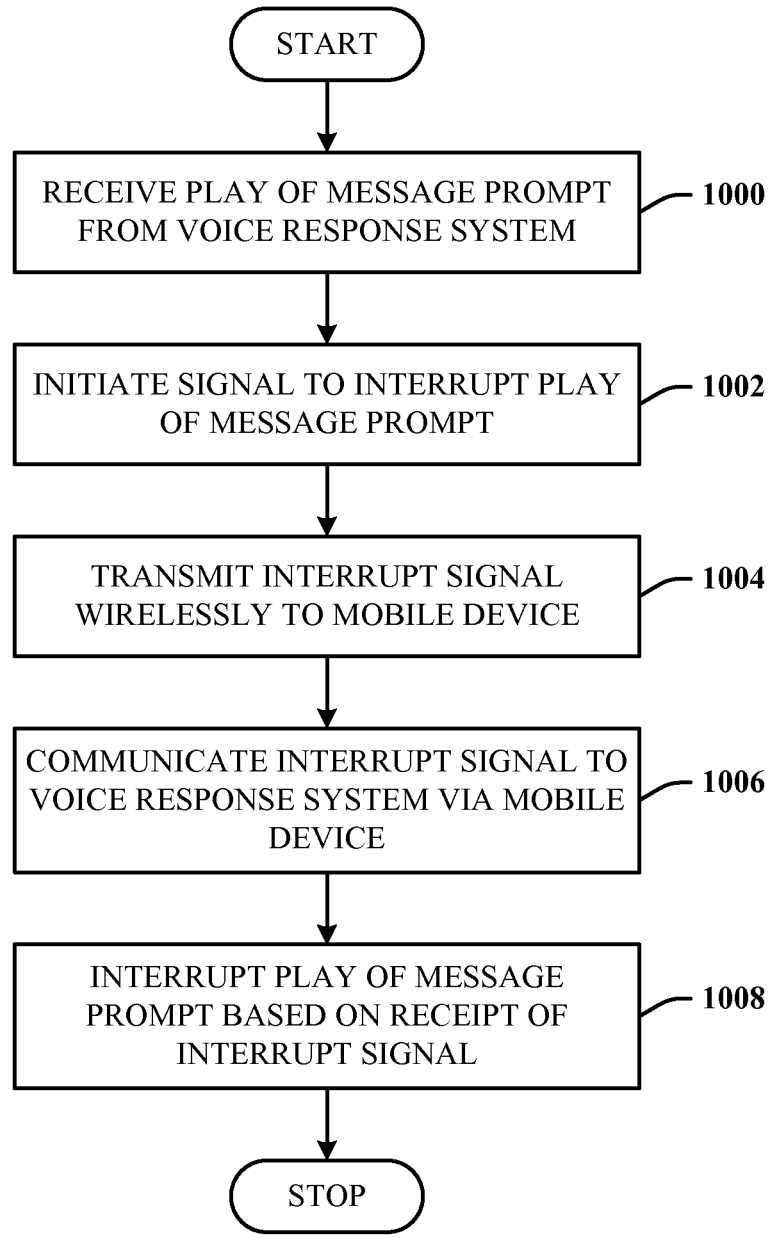
FIG. 10 illustrates a method of communicating a barge-in signal to a voice response system.

FIG. 10 illustrates a method of communicating a barge-in signal to a voice response system. At 1000, play of a message prompt from a voice response system is received. This can be via a vehicle audio system, for example. Alternatively, play can be via a mobile device of a user in the vehicle. At 1002, a signal is initiated to interrupt the play of the message prompt. The signal can be initiated via a tap button on the steering wheel. At 1004, the interrupt signal is transmitted wirelessly to the mobile device. A vehicle-mounted module receives the interrupt signal, and transmits (e.g., using Bluetooth or other short-range radio technology) the signal to the mobile device (e.g., cell phone). Note that the mobile device can also be a vehicle-mounted mobile communications device that receives voice signals via a microphone mounted close to the vehicle driver and/or passenger(s). At 1006, the interrupt signal is communicated to the voice response systems via the mobile device. At 1008, play of the message prompt is interrupted based on receipt of the interrupt signal.

Figure 11:
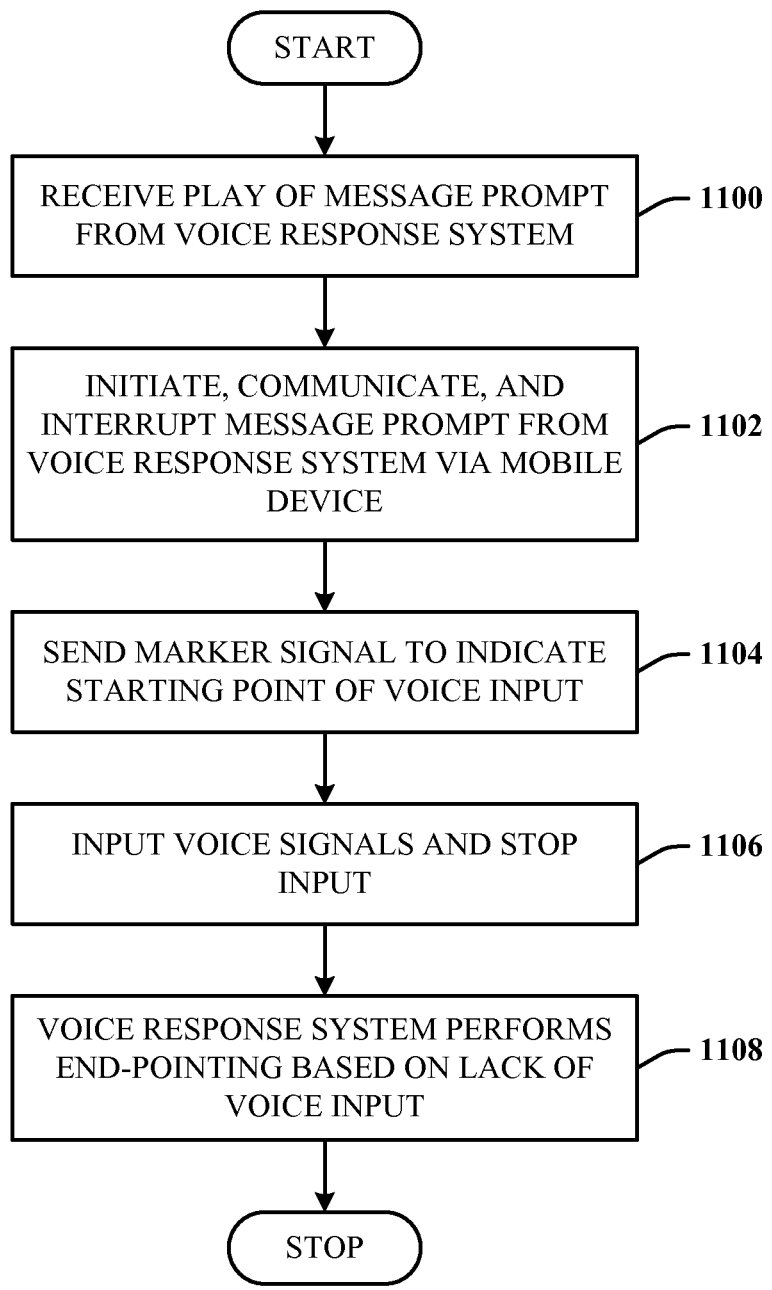
FIG. 11 illustrates a method of end-pointing a voice signal.

FIG. 11 illustrates a method of end-pointing a voice signal. At 1100, play of a message prompt is received from a voice response system. At 1102, interrupt of the message prompt from the voice response system is initiated, communicated, and performed via a mobile device. At 1104, a marker signal is input (in-band) to indicate the starting point of voice input. At 1106, voice signals are input, and then voice input is stopped. At 1108, the voice response system performs end-pointing based on lack of the voice input.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 12:
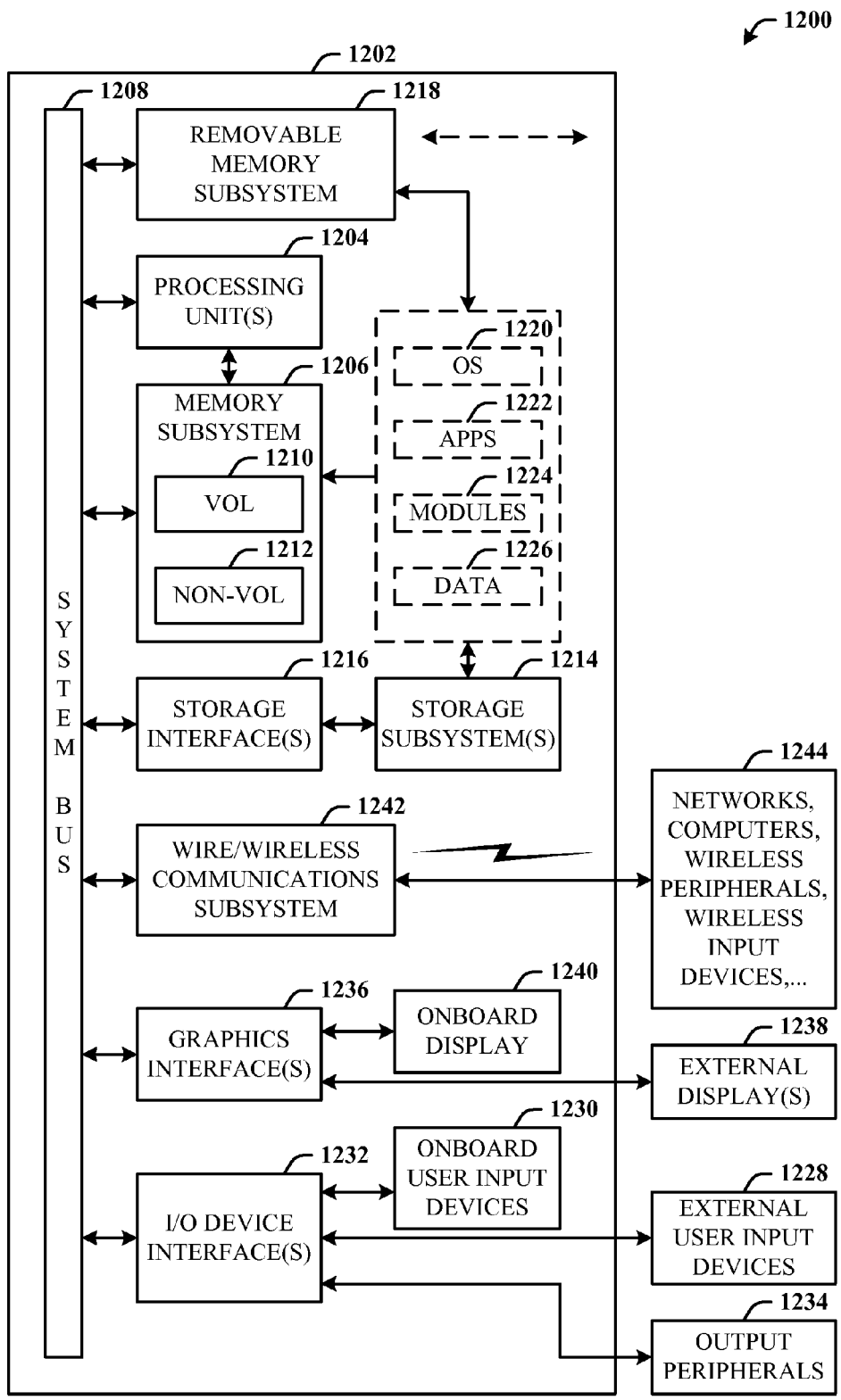
FIG. 12 illustrates a block diagram of a computing system operable to execute in-band signaling in accordance with the disclosed architecture.

Referring now to FIG. 12, there is illustrated a block diagram of a computing system 1200 operable to execute in-band signaling in accordance with the disclosed architecture. In order to provide additional context for various aspects thereof, FIG. 12 and the following discussion are intended to provide a brief, general description of the suitable computing system 1200 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1200 for implementing various aspects includes the computer 1202 having processing unit(s) 1204, a system memory 1206, and a system bus 1208. The processing unit(s) 1204 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1206 can include volatile (VOL) memory 1210 (e.g., random access memory (RAM)) and non-volatile memory (NON-VOL) 1212 (e.g., ROM, EPROM, EEPROM, etc.). A basic input/output system (BIOS) can be stored in the non-volatile memory 1212, and includes the basic routines that facilitate the communication of data and signals between components within the computer 1202, such as during startup. The volatile memory 1210 can also include a high-speed RAM such as static RAM for caching data.

The system bus 1208 provides an interface for system components including, but not limited to, the memory subsystem 1206 to the processing unit(s) 1204. The system bus 1208 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1202 further includes storage subsystem(s) 1214 and storage interface(s) 1216 for interfacing the storage subsystem(s) 1214 to the system bus 1208 and other desired computer components. The storage subsystem(s) 1214 can include one or more of a hard disk drive (HDD), a magnetic floppy disk drive (FDD), and/or optical disk storage drive (e.g., a CD-ROM drive DVD drive), for example. The storage interface(s) 1216 can include interface technologies such as EIDE, ATA, SATA, and IEEE 1394, for example.

One or more programs and data can be stored in the memory subsystem 1206, a removable memory subsystem 1218 (e.g., flash drive form factor technology), and/or the storage subsystem(s) 1214, including an operating system 1220, one or more application programs 1222, other program modules 1224, and program data 1226. Generally, programs include routines, methods, data structures, other software components, etc., that perform particular tasks or implement particular abstract data types. Where the computer 1202 is utilized as a communications server, the one or more application programs 1222, other program modules 1224, and program data 1226 can include the interactive voice response component 102 and internal entities shown in FIG. 1, the interactive voice response component 102 and internal entities of FIG. 2, the system 300 and entities of FIG. 3, the system 400 and entities of FIG. 4, and at least the methods associated with FIGS. 5-11, for example.

All or portions of the operating system 1220, applications 1222, modules 1224, and/or data 1226 can also be cached in memory such as the volatile memory 1210, for example. It is to be appreciated that the disclosed architecture can be implemented with various commercially available operating systems or combinations of operating systems (e.g., as virtual machines).

The storage subsystem(s) 1214 and memory subsystems (1206 and 1218) serve as computer readable media for volatile and non-volatile storage of data, data structures, computer-executable instructions, and so forth. Computer readable media can be any available media that can be accessed by the computer 1202 and includes volatile and non-volatile media, removable and non-removable media. For the computer 1202, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1202, programs, and data using external user input devices 1228 such as a keyboard and a mouse. Other external user input devices 1228 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1202, programs, and data using onboard user input devices 1230 such a touchpad, microphone, keyboard, etc., where the computer 1202 is a portable computer, for example. These and other input devices are connected to the processing unit(s) 1204 through input/output (I/O) device interface(s) 1232 via the system bus 1208, but can be connected by other interfaces such as a parallel port, IEEE 1394 serial port, a game port, a USB port, an IR interface, etc. The I/O device interface(s) 1232 also facilitate the use of output peripherals 1234 such as printers, audio devices, camera devices, and so on, such as a sound card and/or onboard audio processing capability.

One or more graphics interface(s) 1236 (also commonly referred to as a graphics processing unit (GPU)) provide graphics and video signals between the computer 1202 and external display(s) 1238 (e.g., LCD, plasma) and/or onboard displays 1240 (e.g., for portable computer). The graphics interface(s) 1236 can also be manufactured as part of the computer system board.

The computer 1202 can operate in a networked environment (e.g., IP) using logical connections via a wired/wireless communications subsystem 1242 to one or more networks and/or other computers. The other computers can include workstations, servers, routers, personal computers, microprocessor-based entertainment appliance, a peer device or other common network node, and typically include many or all of the elements described relative to the computer 1202. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1202 connects to the network via a wired/wireless communication subsystem 1242 (e.g., a network interface adapter, onboard transceiver subsystem, etc.) to communicate with wired/wireless networks, wired/wireless printers, wired/wireless input devices 1244, and so on. The computer 1202 can include a modem or has other means for establishing communications over the network. In a networked environment, programs and data relative to the computer 1202 can be stored in the remote memory/storage device, as is associated with a distributed system. It will be appreciated that the network connections shown are exemplary and other means of establishing a communications link between the computers can be used.

The computer 1202 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 13:
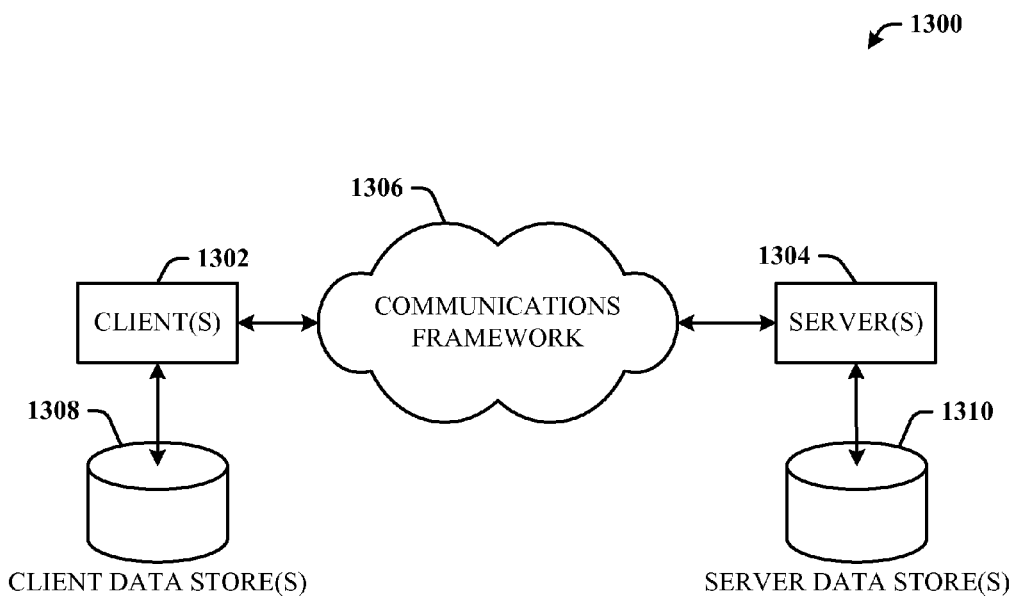
FIG. 13 illustrates a schematic block diagram of a computing environment that supports in-band signaling.

Referring now to FIG. 13, there is illustrated a schematic block diagram of a computing environment 1300 that supports in-band signaling. The environment 1300 includes one or more client(s) 1302. The client(s) 1302 can be hardware and/or software (e.g., threads, processes, computing devices). The client(s) 1302 can house cookie(s) and/or associated contextual information, for example.

The environment 1300 also includes one or more server(s) 1304. The server(s) 1304 can also be hardware and/or software (e.g., threads, processes, computing devices). The servers 1304 can house threads to perform transformations by employing the architecture, for example. One possible communication between a client 1302 and a server 1304 can be in the form of a data packet adapted to be transmitted between two or more computer processes. The data packet may include a cookie and/or associated contextual information, for example. The environment 1300 includes a communication framework 1306 (e.g., a global communication network such as the Internet) that can be employed to facilitate communications between the client(s) 1302 and the server(s) 1304.

Communications can be facilitated via a wire (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The client(s) 1302 can include wireline and wireless devices, such as the in-band signaling audio component 108 of FIG. 1, the communications device 204 of FIG. 2, where additionally, the communications framework 1306 accommodates analog and digital voice communications such as a telephone carrier, cell phone carrier, etc. The server(s) 1304 can include the interactive voice response component 102 in the figures, for example. Accordingly, although the environment 1300 may include IP frameworks, it can also apply to voice communicators systems associated with phone calls, for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An interactive voice response system for conducting voice response communications, the interactive voice response system comprising:
   at least one processor; and
   a computer readable medium having executable instructions stored thereupon which, when executed by the at least one processor, cause the at least one processor to
   initiate a marker mode at the interactive voice response system;
   begin playing of a message prompt;
   receive, at the interactive voice response system, a first marker signal, a second marker signal, and voice signals;
   interrupt the playing of the message prompt in response to receiving the first marker signal;
   identify, based upon the first marker signal, a beginning of a voice command represented by the voice signals;
   identify, based upon the second marker signal, at least one of a beginning of a voice command;
   ignore at least a portion of audio signals received at the interactive voice response system before the first marker signal and after the second marker signal; and take an action, in response to the voice command.

2. The system of claim 1, wherein initiating the marker mode comprises initiating the marker mode in response to receiving the first marker signal.

3. The system of claim 1, wherein the computer readable medium has further executable instructions stored thereupon which, when executed by the processor, cause the interactive voice response system to send an instruction to input a further marker signal for further communications.

4. The method of claim 1, further comprising receiving a further marker signal and designating, based upon the marker signal and the further marker signal, the beginning of the voice command and the end of the voice command.

5. The system of claim 1, wherein receiving the marker signal comprises receiving a dual-tone multi-frequency signal.

6. The system of claim 1, wherein the computer readable medium has further executable instructions stored thereupon which, when executed by the processor, cause the interactive voice response system to initiate a non-marker mode of operation at the interactive voice response system in response to determining that the audio does not include background noise.

7. The system of claim 1, wherein receiving the first marker signal comprises receiving a signal generated by a mobile device in response to a command received at a vehicle.

8. A computer-implemented method for conducting voice response communications, the method comprising:
- initiating a marker mode at an interactive voice response system;
- beginning playing of a message prompt;
- receiving, at the interactive voice response system, a first marker signal, voice signals, and a second marker signal;
- interrupting the playing of the message prompt in response to receiving the first marker signal;
- identifying, based upon the first marker signal, a beginning of a voice command represented by the voice signals;
- identifying, based upon the second marker signal, an end of the voice command;
- ignoring at least a portion of audio signals received at the interactive voice response system before the first marker signal and after the second marker signal; and
- taking an action, in response to the voice command.

9. The method of claim 8, further comprising sending an instruction to input a further marker signal for further communications.

10. The method of claim 8, wherein receiving the first marker signal comprises receiving a first dual-tone multi-frequency signal and wherein receiving the second marker signal comprises receiving a second dual-tone multi-frequency signal.

11. The method of claim 8, wherein receiving the first marker signal comprises receiving a first voice command and wherein receiving the second marker signal comprises receiving a second voice command.

12. The method of claim 8, further comprising initiating a non-marker mode of operation at the interactive voice response system in response to determining that the audio does not include background noise.

13. The method of claim 8, wherein receiving the first marker signal comprises receiving a signal generated by a mobile telephone in response to a command received at a vehicle.

14. The method of claim 8, wherein initiating the marker mode comprises initiating the marker mode in response to receiving the marker signal.

15. A tangible computer-readable medium comprising computer-executable instructions stored thereon that, when executed by a computer, cause the computer to:
- initiate a marker mode at an interactive voice response system;
- receive, at the interactive voice response system, a first marker signal, a voice signal, and a second marker signal;
- identify, based upon the first marker signal, a beginning of a voice command represented by the voice signal;
- identify, based upon the second marker signal, an end of the voice command;
- ignore at least a portion of audio signals received at the interactive voice response system before the first marker signal and after the second marker signal;
- playing a message prompt, in response to the voice command; and
- interrupting the playing of the message prompt in response to receiving a third marker signal.

16. The tangible computer-readable medium of claim 15, further comprising sending an instruction to input a further marker signal for further communications.

17. The tangible computer-readable medium of claim 15, wherein receiving the first marker signal comprises receiving a first dual-tone multi-frequency signal and wherein receiving the second marker signal comprises receiving a second dual-tone multi-frequency signal.

18. The method of claim 1, wherein ignoring, based on receiving the marker signal, audio signals received at the interactive voice response system comprises ignoring audio signals that are not associated with a voice command.

19. The method of claim 18, wherein ignoring signals that are not associated with a voice command comprises ignoring background noise.

* * * * *